Aug. 5, 1958 S. P. BRUCE 2,845,920
ROTARY SOLENOID TYPE INDEXING MECHANISM
Filed June 2, 1953
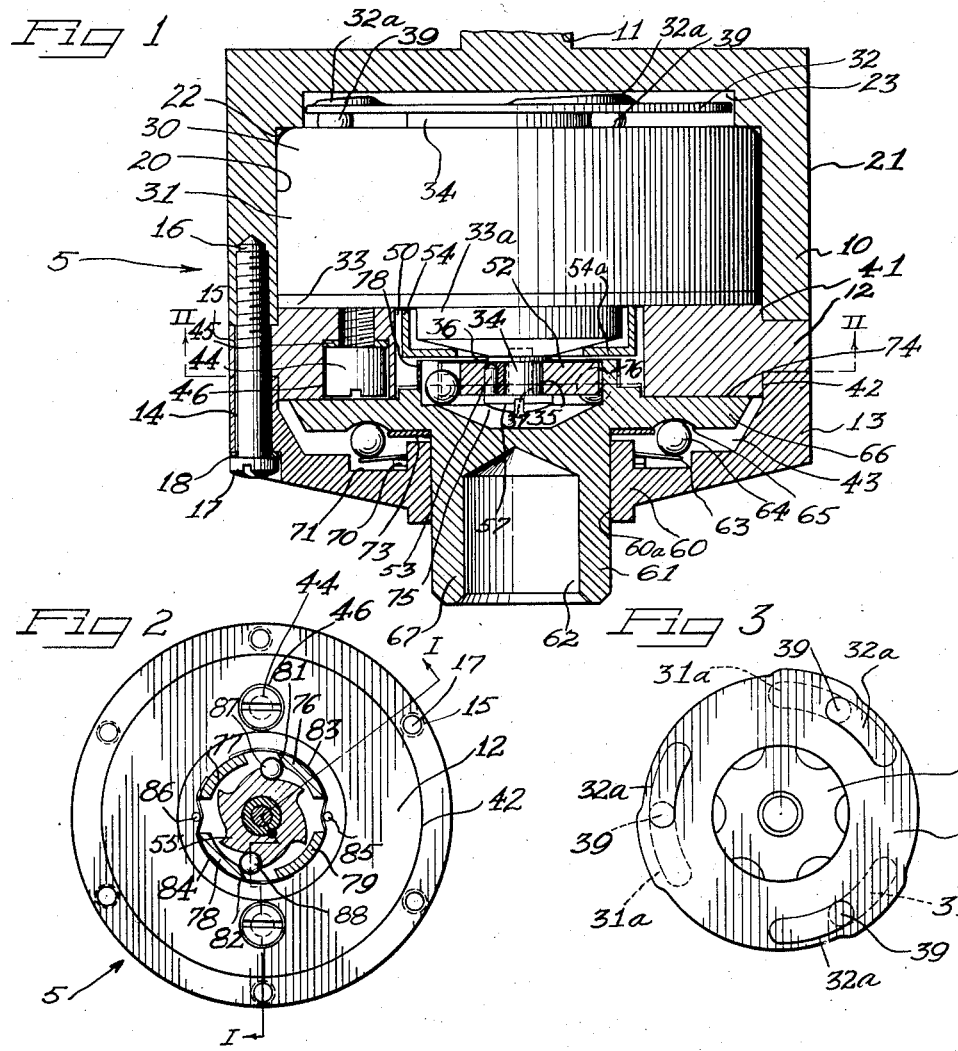
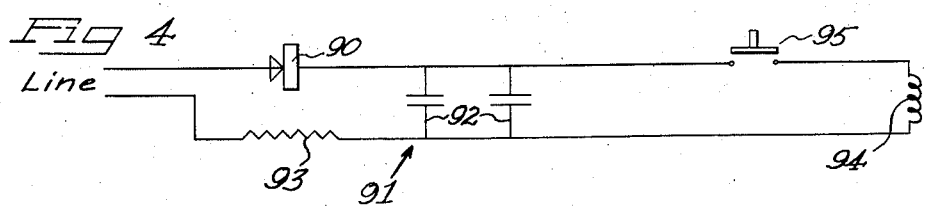
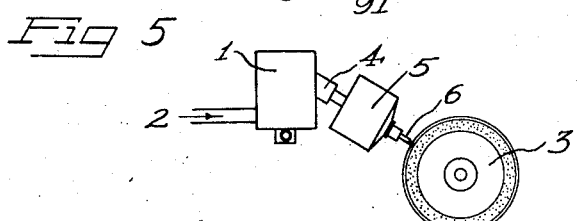
Inventor
Stanford P. Bruce United States Patent Office 2,845,920
Patented Aug. 5, 1958

2,845,920

ROTARY SOLENOID TYPE INDEXING MECHANISM

Stanford P. Bruce, Detroit, Mich., assignor to Wheel Trueing Tool Company, Detroit, Mich., a corporation of Michigan Application June 2, 1953, Serial No. 359,121

6 Claims. (Cl. 125—11)

The present invention relates to a rotary solenoid type indexing mechanism and particularly to an indexing mechanism for rotating a diamond tool through a preselected arc to turn a new face or cutting edge of the tool into dressing relation with an abrasive grinding wheel to true and dress the same.

As abrasive wheels become worn or otherwise out of true from long use, it is customary practice to dress or true the cutting surface of the wheel by passing a cutting tool, such as a diamond point, across the surface thereof parallel to the axis of rotation of the wheel, thereby dressing or reshaping the wheel to its proper configuration. Continued use of a dressing tool tends to wear the diamond point unevenly, resulting in worn surfaces or "flats" being formed on the diamond point, thereby decreasing its useful life.

To overcome this difficulty, I have previously suggested a grinding wheel mechanism in which the dressing mechanism is provided with a rotatable tool holder. Periodic rotation of the tool holder during the wheel dressing or trueing operation is effected by providing an indexing mechanism which rotates the tool holder, and the tool contained therein, in step-by-step sequence after the dressing tool has completed a traverse across the surface of the abrasive wheel being dressed.

After continued indexing of the tool holder the diamond point assumes a generally pyramidal-shape which is not only the most effective shape for the diamond point from the standpoint of accurate dressing of the wheel, but which also insures effective use of the same diamond tool for longer periods of time than is possible in dressing assemblies which require manual indexing or which are otherwise devoid of an automatic indexing arrangement.

The present invention is particularly concerned with an improved indexing mechanism which provides means for periodically indexing the diamond tool or other abrasive tool used as a dressing tool for a grinding wheel. One of the distinctive features of the present invention is the provision of a rotary solenoid, electrically operated, indexing mechanism. Some dressing assemblies may include an electrical system for effecting movement of the tool holder carriage across the face of the grinding wheel. The mechanism of the present invention may be conveniently operated and energized by electrical energy from the carriage system. Otherwise, a separate source of energy can be provided for the operation of the indexing system and mechanism of the present invention.

Essentially, the mechanism of the present invention includes a casing or housing arranged to be mounted in the usual quill on a movable carriage in the grinding wheel dressing assembly, a rotatable tool holder disposed within the casing or housing and arranged to receive a diamond tool or other dressing tool, an electrically operated rotary type solenoid in the casing, and an associated ratchet and locking ball or overrunning clutch mechanism which transmits the rotary motion of the solenoid to the tool holder for rotation of the tool holder through a predetermined arc in one direction.

Numerous features and advantages will be readily apparent from the following detail description and appended claims and from the accompanying drawings in which like reference numerals refer to like parts and in which:

Figure 1 is a full section of a rotary solenoid type indexing mechanism embodying the principles of the present invention and taken along the broken line I—I of Figure 2;

Figure 2 is an end sectional view of the embodiment of the invention illustrated in Figure 1 and taken along the broken line II—II of Figure 1;

Figure 3 is an end elevational view of a rotary type solenoid for use in the embodiment of the present invention illustrated in Figures 1 and 2 and showing the armature plate end of the rotary solenoid;

Figure 4 is a schematic electrical wiring diagram for energizing and actuating the rotary solenoid type indexing mechanism of the present invention; and Figure 5 is a diagrammatic illustration of a complete dressing assembly in operation and including a traversing mechanism, an indexing mechanism, a dressing tool and a grinding wheel being dressed.

As stated, there is illustrated in Figure 5 a complete dressing assembly in operation. A traversing mechanism 1 which may operate through electrical energization means 2 and is equipped to define the contour to be imparted to a grinding wheel 3, has a quill 4 which carries an indexing mechanism 5 further described in detail hereinbelow. A diamond point or other type abrading tool 6 is received in a recess in the indexing mechanism and is positioned to contact, abrade and dress the periphery of the wheel 3 as the same is axially traversed by the remainder of the system.

In Figures 1 and 2 there is illustrated an indexing mechanism, indicated generally at 5, which incorporates the principles of the present invention. The indexing mechanism 5 is enclosed and carried in a housing of a main body 10 which carries a securing and mounting shaft 11 for mounting the indexing mechanism in the quill of the traversing dressing mechanism 1. A thrust spacer 12 is secured between a cap member 13 and the body 10. Matching drill holes 14 and 15 in the cap member 13 and in the thrust spacer 12 respectively and tapped holes 16 in the body member 10 permits these several parts to be secured together by bolts or machine screws 17 which are secured in place by such convenient means as lock washers 18 if the use of the same is so desired.

A large cavity 20 in the body member 10 provides the space for the rotary solenoid 30 within the housing. The cavity 20 is preferably concentric with the outside cylindrical wall 21 of the body member 10 but is provided with a shoulder 22 and a further recessed cavity section 23 to provide adequate support for the solenoid case 31 and an adequate space for the armature plate 32, respectively. The armature plate 32 is free within the cavity 23 while the solenoid case 31 is held firmly in the cavity 20 by the thrust spacer 12 which is secured to the base 33 of the rotary solenoid 30.

The thrust spacer 12 has machined peripheral portions of a lesser diameter than the outside cylindrical surface 21 of the housing body 10 so that the reduced diameter shoulder 41 fits into the cavity 20 and so that the reduced diameter shoulder section 42 of the thrust spacer 12 fits into a cavity 43 in the housing cap 13. A stepped hole 46 is provided in the thrust spacer 12 to permit the thrust spacer 12 to be secured to the base 33 of the rotary solenoid 30 by any convenient securing means such as a machine screw 44 and a lock washer 45 and thus prevent the housing of the rotary solenoid from rotating when the coil thereof is energized or deenergized as hereinafter described.

A central bore 50 is provided through the thrust spacer 12 to accommodate several of the moving parts of the indexing mechanism 5.

An armature 34 attached to the armature plate 32 extends through the rotary solenoid case 31 housing a solenoid coil, shown schematically at 94 in Figure 4, and extends into the bore 50 in the thrust spacer 12. The end of the shaft 34 which extends into the bore 50 is provided with a reduced diameter section 35 and a small shoulder 36 through which the tapped hole 37 is provided so that a screw or bolt 57 may be carried therein to secure a ratchet 52 about the reduced diameter section 35 of the armature 34 and against the shoulder portion 36. A small pin 53 is inserted into matching keyway slots in the ratchet 52 and section 35 of the armature 34 to prevent relative rotation between the ratchet and the shaft or armature. A ball retaining cup or guard 54 may be secured to the base 33 of the rotary solenoid 30, and surrounds the spring seating and casing extension 33a which extends into the bore 50 from the base 33, and has an inwardly turned flange 54a. The operational characteristics of the several parts and the rotary solenoid 30, as well as the remaining parts, will be explained in detail below.

The housing cap 13 has a centrally apertured annulus as at 60 provided with a bearing surface about the aperture 60a to rotatably engage the tool well 61 which is provided at its outwardly extending end with a tool seating recess 62. The tool well 61 is urged against the thrust spacer 12 by a ring spring 63 urging balls 64 into ring race 65 in a shoulder portion 66 of the tool well 61. The shoulder portion 66, ball and race arrangement and spring ring 63 are all received within the cavity 43 in the housing cap 13. The spring ring 63 is maintained continually biased by shims 70 placed between the spring ring 63 and the wall 71 heading the cavity 43; the shims 70 placed between the spring ring 63 and the wall 71 heading the cavity 43 and the shims have a greater thickness than the space between each of the balls 64 and the wall 71. In addition, the spring ring 63 surrounds and is positioned by a bearing shoulder portion of the annulus 60 in the housing cap 13.

A spacer 73 surrounding the tool-receiving section 67 of the tool well 61 within the cavity 43 of the housing cap 13 provides equal spacing of balls 64 within ball race 65.

As a matter of detail, the function of which is hereinafter described, the bearing shoulder 66 of the tool well 61 is provided with a friction surface 74 which bears against the thrust spacer 12. Axially the tool well 61 is provided with a cavity 75, opposite to the tool receiving opening 62, to receive the screw 57 and the ratchet 52 which are surrounded by upstanding projections 76, 77, 78 and 79, best viewed in section in Figure 2.

The several upstanding projections 76, 77, 78 and 79 are each of substantially the same arc length and are preferably substantially symmetrically disposed about the cavity 75 and substantially equally spaced apart. The projections 76 and 78 are provided with tapered leading edges 81 and 82, respectively. The term "leading edge" is herein employed to mean the edge first encountered in a clockwise direction as viewed in Figure 2. The trailing edges of all four projections and the leading edges of the projections 77 and 79 lie in planes substantially radial with respect to the whole assembly. A pair of springs, much in the nature of leaf springs or flat strip springs, 83 and 84 overlie the spacing on either side of the projection 76 and the projection 78, respectively. That is, the flat strip spring 83 overlies the spacing between the projection 76 and the projection 77 and the spacing between the projection 79 and the projection 76 and rests against the projections 76, 77 and 79, while the flat strip spring 84 overlies the spacing between the projections 77 and 78 and the spacing between the projections 78 and 79 lying against the projections 77, 78 and 79.

Small pin holes are provided respectively in the tool well 61 between the projections 79 and 76 and between projections 77 and 78 and pins 85 and 86 are seated therein respectively. These pins 85 and 86 are properly positioned to hold the springs 83 and 84 and serve to maintain the springs in their proper location permitting flexing action when ratchet balls 87 and 88, positioned in the spaces between the projections 76 and 77, and 78 and 79 respectively, bear against the springs during the operational cycle described hereinbelow.

The ratchet 52 is provided with preferably about six balls engaging teeth 55 which are gradually tapered inwardly in a counterclockwise direction as viewed in Figure 2 to provide a gradually inclined race for balls 87 and 88 and with sharply contoured, almost radial, clockwise faces formed for the balls 87 and 88 to seat against.

When the ratchet 52 is rotated in a clockwise direction as viewed in Figure 2, the ball seating clockwise surfaces of two of the ratchet teeth 55 seat against the balls 87 and 88 and force the same against the leading edges 81 and 82, respectively, of the projections 76 and 78. Upon counterclockwise rotation of the ratchet 52, the inclined counterclockwise surfaces of the teeth 55 force the balls 87 and 88 radially outwardly against the springs 83 and 84, respectively, until the apex of the teeth 55 pass under the balls. Immediately thereafter the springs press the balls into the ball seating surfaces of teeth adjacent to the teeth against which the balls were formerly seated but clockwise displaced therefrom.

The rotary type solenoid 30, viewed from its armature plate end in Figure 3, the end opposite to the end from which it is viewed in Figure 2, has such operational characteristics that when the precision coil 94 contained within the casing 31 is energized, the magnetic forces exerted on the armature 34 pull the armature plate 32 toward the casing 31. The armature plate 32 is normally separated from the casing 31 by bearing balls 39 which are preferably three in number, and which are seated in inclined indentations 31a in the casing 31 and inclined indentations 32a in the armature plate 32. Forcing the armature plate in the direction of the rotary solenoid casing 31 causes it to ride in that direction on the balls 39, but since the inclined planes 31a and 32a are matched, the armature plate 32 rotates an angular distance defined by the length and angle of inclination of the indentations 31a and 32a while it is moving toward the casing 31. This combined rotary and longitudinal movement of the armature and armature plate upon energization of the coil of the solenoid may be defined as the power stroke. The arc length of the rotational movement is preselected in accordance with the pitch of the teeth 55 and the amount of rotation desired for the tool held by the tool well 61.

Upon completion of the power stroke, a spring contained within the rotary solenoid unit and seated in the spring seating casing extensions 33a of the base 33 of the solenoid, forces the armature 34 and armature plate 32 to return to its normal position immediately following deenergization of the precision coil, as shown in Figures 1 and 3.

Figure 4 illustrates a preferred energization system and power supply for the indexing mechanism and rotary type solenoid for which the ultimate power source may be, as indicated above, either from the traversing unit or from some other electrical supply line. The input power, most conveniently being from an alternating current source, is halfwave rectified by the rectifier 90, which may be of a dry selenium disk type or any other convenient type, and substantially filtered by the surge network 91 including the capacitors 92 and the resistor 93. The solenoid coil, schematically illustrated and identified as 94, is energized from the output of the surge network 91 when a switch 95 in series with the coil 94 is closed. This switch is preferably of the pushbutton or instantaneous variety but may be a knife switch or toggle switch or any other desired single pole or double pole switch as found convenient or expedient.

Recalling that which was explained above in connection with the operation of the rotary type solenoid 30 it can clearly be understood that closing the switch 95 energizes the coil 94 and causes the solenoid 30 to proceed through its power stroke and upon opening the switch 95, thus opening the circuit, the precision coil 94 is deenergized and the spring seated in the base extension 33a and against the armature 34 causes the solenoid parts to return to their normal deenergized position. In a modified embodiment of the present invention the switch 95 may be mounted on or incorporated into the housing or casing of the indexing mechanism for convenient connection to the precision coil 94 and to the power supply. Another preferred mounting position for the switch 95 is on the traversing mechanism 1 so placed that the switch will be closed at the end, or at the beginning, of the traversing strokes to present a new cutting edge of the tool 6 to the wheel 3 on the next dressing stroke.

In operation when the switch 95 is closed the precision coil 94 is energized and causes the armature plate, which rides on the balls 39 seated in corresponding inclined plane ball races 32a and 31a, to rotate through a preselected angle and move a slight distance allowed therefor in the direction of the rotary type solenoid casing 31. Since the armature plate 32 is securely connected to the armature 34 the armature 34 will rotate therewith and rotatably carry the ratchet 52 through the same angle of rotation. The ratchet 52, however, having teeth 55, is forced against balls 87 and 88 and forces the balls against the leading edges 81 and 82 or projections 76 and 78 of the tool well 61. Rotation of the ratchet 52 by the rotary type solenoid 30 rotates the tool well through substantially the same preselected angle.

The rotation of the tool well 61 is accomplished against the frictional force existing in the interface between the friction surface 74 of the tool well 61 and the thrust spacer 12. The spring 63 forcing the balls 64 seated in the ball race 65 and urging the tool well 61 against the thrust spacer 12 maintains this frictional interface in pressure contact thus requiring strong rotational force to overcome the same. This is an important feature of the present invention since the strong frictional contact at the interface between the friction surface 74 and the thrust spacer 12 prevents rerotation or return rotation of the tool well during the return stroke of the solenoid armature and its associated parts. It will be understood, of course, that the metal to metal interface here is well adapted to prevent rerotation while subjected to a thrust load from spring 63 on the return stroke.

At the completion of the power stroke or indexing stroke of the armature plate and the armature, a spring forces their return to their original position, that is, they are rotated in the opposite direction so that the armature plate 32 rides up the inclined planes and on the balls 39, and the ratchet 55 is rerotated therewith. During this return stroke half of the indexing cycle, the balls 87 and 88 ride outwardly along the inclined surfaces of the teeth 55 of the ratchet 52 and are urged against the springs 83 and 84 covering the spacing between the driving projections 76 and 77, and 78 and 79, respectively, until the ratchet 52, as viewed in Figure 2, is sufficiently returned in a counterclockwise direction for the balls 87 and 88 to drop against the driving face of the next succeeding teeth 55 as urged by the strip springs.

Reenergization of the coil 94 through closing the switch 95 will repeat the above described cycle.

From the foregoing detailed description of the construction and operational cycle of the indexing mechanism it will be observed that the ratchet, ball and projection group provide a convenient one-way, overrunning clutch assembly for indexed, one way rotation of the tool well and tool through given increments of rotation.

It will be understood that numerous modifications and variations may be effected without departing from the scope of the novel concepts of the present invention.

I claim as my invention:

1. A rotary indexing mechanism comprising a rotary type solenoid having a rotatable armature, a ratchet member carried by said rotatable armature of said solenoid, a tool holder, spaced projections on said tool holder, and locking ball and spring means interconnecting said spaced projections and said ratchet member whereby said tool holder is incrementally rotated in one direction upon incremental rotation of said rotary type solenoid.

2. A rotary indexing mechanism for incrementally rotating a dressing tool to present a new dressing edge of the dressing tool to the article being dressed, comprising a housing, a rotary type solenoid secured within a cavity in said housing, a tool well rotatably mounted in said housing and extending therethrough, friction means to restrain rotation of said tool well, and a ratchet and locking ball and projection overrunning clutch system coupling said tool well to said solenoid whereby said tool well is rotated only during a power stroke of said solenoid.

3. In a dressing mechanism for dressing the periphery of a grinding wheel, in combination, a traversing mechanism, an indexing mechanism carried by said traversing mechanism, a dressing tool carried by said indexing mechanism, and energizing means for said indexing mechanism and said traversing mechanism, said indexing mechanism comprising a housing, a rotary type solenoid secured within a cavity in said housing, a tool well rotatably mounted in said housing and extending therethrough, friction means to restrain rotation of said tool well, and an overrunning clutch mechanism coupling said tool well to said solenoid whereby said tool well is rotated only during a power stroke of said solenoid.

4. In a dressing mechanism for dressing the periphery of a grinding wheel, in combination, a traversing mechanism, an indexing mechanism carried by said traversing mechanism, a dressing tool carried by said indexing mechanism, and energizing means for said indexing mechanism and said traversing mechanism, said indexing mechanism comprising a rotary type solenoid having a rotatable armature, a ratchet member carried by said rotatable armature of said solenoid, a tool holder, spaced projections on said tool holder, and means interconnecting said spaced projections and said ratchet member whereby said tool holder is incrementally rotated in one direction upon incremental rotation of said rotary type solenoid.

5. In a dressing mechanism for dressing the periphery of a grinding wheel, in combination, a traversing mechanism, an indexing mechanism carried by said traversing mechanism, a dressing tool carried by said indexing mechanism, and energizing means for said indexing mechanism and said traversing mechanism, said indexing mechanism comprising a rotary type solenoid having a rotatable armature, a ratchet member carried by said rotatable armature of said solenoid, a tool holder, spaced projections on said tool holder, means interconnecting said spaced projections and said ratchet member whereby said tool holder is incrementally rotated in one direction upon incremental rotation of said rotary type solenoid, and means to selectively energize said rotary type solenoid to rotate the same and present a new cutting edge of said dressing tool to said wheel.

6. In a dressing mechanism for dressing the periphery of a grinding wheel, in combination, a traversing mechanism, an indexing mechanism carried by said traversing mechanism, a dressing tool carried by said indexing mechanism, and energizing means for said indexing mechanism, said indexing mechanism comprising a housing, a rotary type solenoid secured within a cavity in said housing, a tool well rotatably mounted in said housing and extending therethrough, friction means to restrain rotation of said tool well, and an overrunning clutch mechanism coupling said tool well to said solenoid whereby said tool well is rotated only during a power stroke of said solenoid.

References Cited in the file of this patent

UNITED STATES PATENTS

| | | |
|---|---|---|
| 651,706 | Forbes | June 12, 1900 |
| 1,367,283 | Simon | Feb. 1, 1921 |
| 1,719,881 | Farmer | July 9, 1929 |
| 2,049,880 | Winkler | Aug. 4, 1936 |
| 2,449,178 | Sansbury | Sept. 14, 1948 |
| 2,496,880 | Leland | Feb. 7, 1950 |
| 2,531,905 | Carpenter | Nov. 28, 1950 |
| 2,576,609 | Kreiner | Nov. 27, 1951 |
| 2,587,172 | Koebel | Feb. 26, 1952 |

FOREIGN PATENTS

| | | |
|---|---|---|
| 229,066 | Switzerland | Dec. 16, 1943 |
| 307,336 | Germany | Aug. 14, 1918 |